United States Patent [19]

Berger et al.

[11] Patent Number: 5,730,014
[45] Date of Patent: Mar. 24, 1998

[54] VANDAL-RESISTANT TORQUE SENSITIVE RELEASE MECHANISM

[75] Inventors: Simon Berger, Lido Beach; Peter Zoltan, Maspeth, both of N.Y.

[73] Assignee: Securitech Group, Inc., Maspeth, N.Y.

[21] Appl. No.: 700,632

[22] Filed: Aug. 16, 1996

[51] Int. Cl.$^6$ .................................. E05B 15/16; F16D 7/06
[52] U.S. Cl. ........................... 70/422; 70/224; 70/189; 292/DIG. 27; 292/350; 464/36
[58] Field of Search .......................... 70/422, 224, 222, 70/221, 223, 188, 189; 81/4, 473, 474, 475, 480, 481; 464/36; 292/DIG. 27, 350, 348

[56] References Cited

U.S. PATENT DOCUMENTS

| | | | |
|---|---|---|---|
| 1,466,148 | 8/1923 | Sands | 464/39 |
| 1,516,152 | 11/1924 | Dumont | 464/39 |
| 1,899,996 | 3/1933 | Sullivan | 292/DIG. 27 |
| 1,910,125 | 5/1933 | Root | 464/39 |
| 2,291,655 | 8/1942 | Schlage | 70/224 |
| 2,459,920 | 1/1949 | Clark | 70/233 |
| 2,469,601 | 5/1949 | Lee | 292/DIG. 27 |
| 2,797,564 | 7/1957 | Bonneau et al. | 81/475 |
| 3,016,724 | 1/1962 | Sussman . | |
| 3,314,708 | 4/1967 | Welch | 292/DIG. 27 |
| 3,662,628 | 5/1972 | Schnepel | 81/475 |
| 4,195,502 | 4/1980 | Best et al. | 70/224 |
| 4,517,865 | 5/1985 | Huang | 81/475 |
| 4,655,059 | 4/1987 | Best et al. | 70/224 |
| 4,773,240 | 9/1988 | Foshee | 70/224 |
| 4,941,497 | 7/1990 | Fan | 292/DIG. 27 |
| 5,010,755 | 4/1991 | Best | 70/222 |
| 5,617,749 | 4/1997 | Park | 292/DIG. 27 |
| 5,651,280 | 7/1997 | Park | 70/223 |

*Primary Examiner*—Darnell M. Boucher
*Attorney, Agent, or Firm*—Abelman, Frayne & Schwab

[57] ABSTRACT

A vandal-resistant torque sensitive release mechanism for coupling an actuating handle to a lock mechanism. The torque sensitive release mechanism: is in the form of a slip-clutch, which utilizes spherical ball connectors in cooperating detents; is connected at one end to the operating handle via threaded engagement; and permits an adjustment of the disengagement force. A conventional type connection is provided at the other end of the slip clutch to allow a mutiplicty of different lock connections for coupling the handle operating to the operating lock mechanisms via the slip clutch.

21 Claims, 3 Drawing Sheets

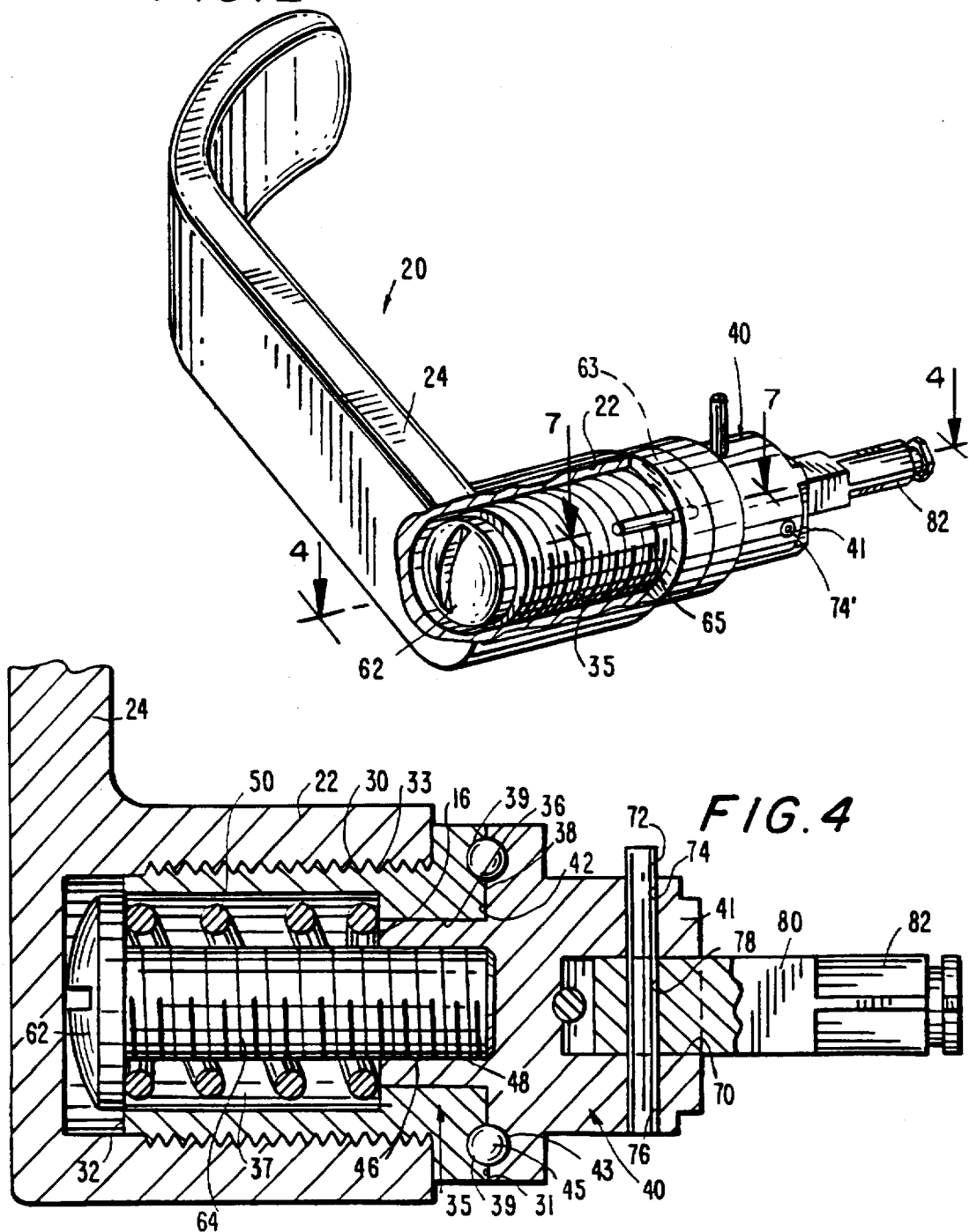

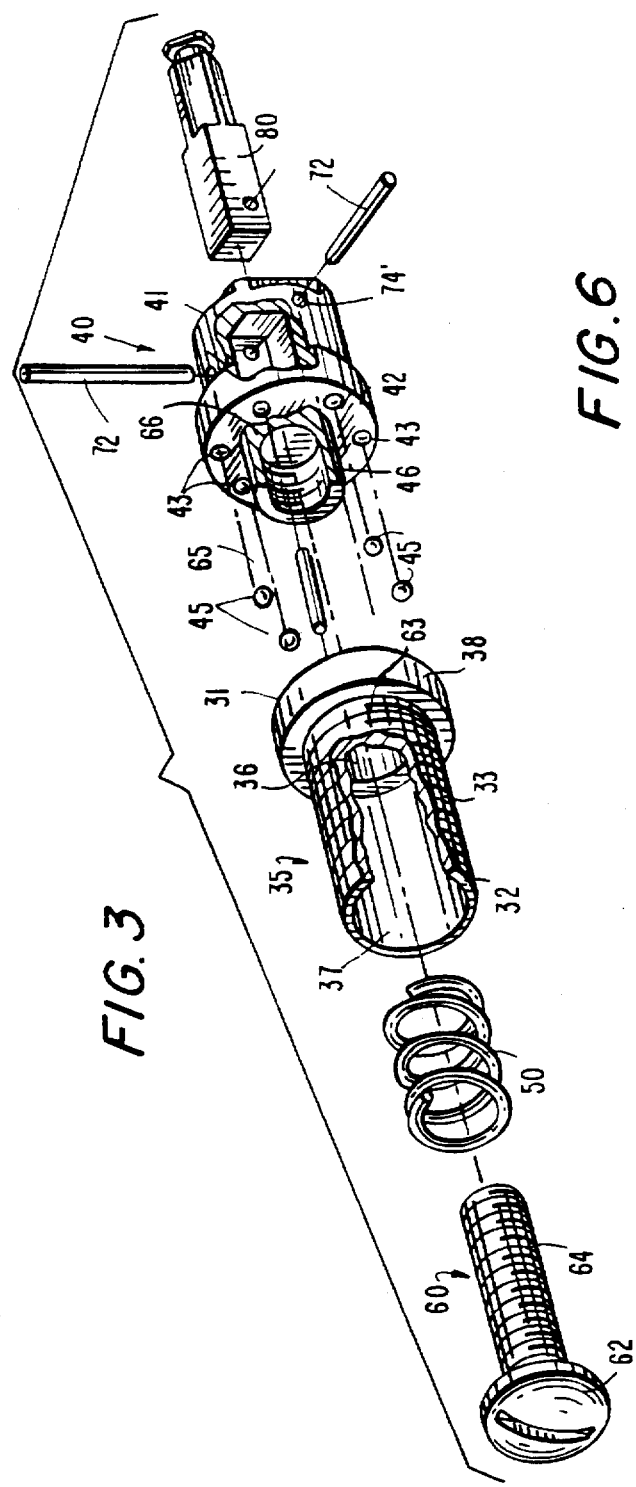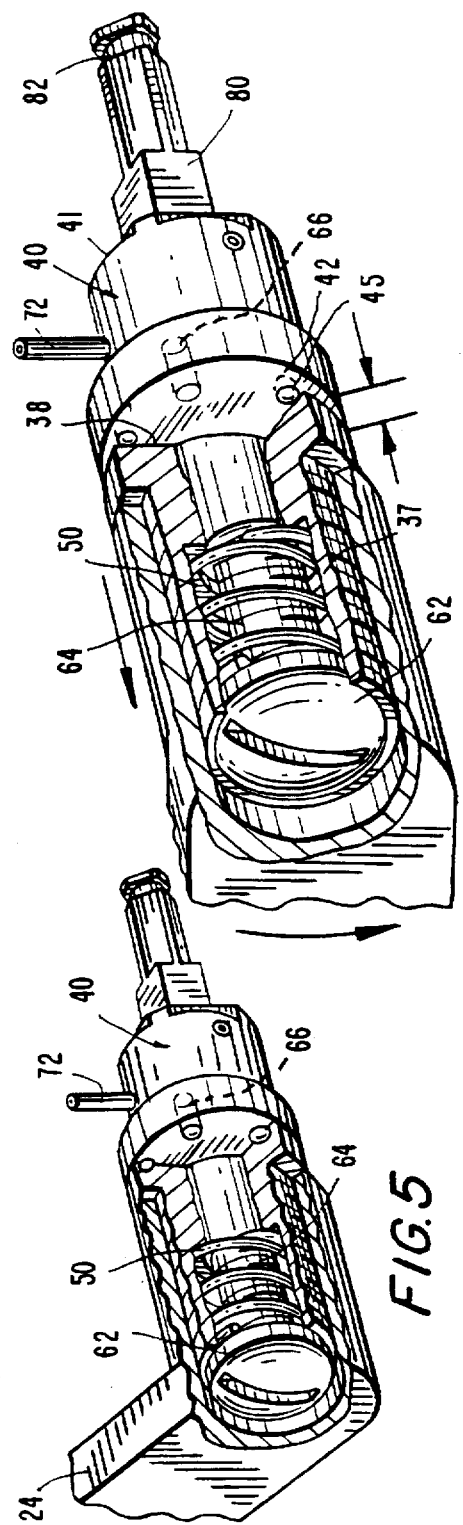

VANDAL-RESISTANT TORQUE SENSITIVE RELEASE MECHANISM

FIELD OF THE INVENTION

The present invention relates to a vandal-resistant torque sensitive release mechanism for the coupling of lock to an actuating handle. The torque sensitive release mechanism includes a slip clutch type of connection between the actuating handle and lock mechanism such that upon the application of excessive force the connection will be decoupled, thereby rendering the lock mechanism inoperable, without damaging the lock mechanism or any of the operating connecting members. The mechanism may be readily reset after the application of excessive force. Should the release mechanism become worn after extended use it may readily be replaced by a simple disconnection to both the actuating handle and the lock mechanism. Further, the force at which the release mechanism decouples the actuating handle from the lock mechanism may be adjusted.

BACKGROUND OF THE INVENTION

The invention relates to a vandal-resistant torque sensitive release mechanism which is utilized to connect a manually operable actuating handle to the lock mechanism. Such torque sensitive release mechanisms typically include a slip clutch connection between the actuating handle and lock mechanism, with the clutch release force being predetermined such that upon the application of excessive force the actuating handle will be disconnected from the lock mechanism. Such torque sensitive release mechanisms are typically shown in U.S. Pat. Nos. 4,195,502, 4,312,201, 4,550, 581, 4,667,994, 4,773,240, 5,010,755. Other torque sensitive release mechanisms for applications other than in conjunction locks are shown in U.S. Pat. Nos. 1,232,779, 1,466,752, 3,136,400, 3,016,724. These devices are in some instances capable of only a single use, do not readily permit the replacement of the torque sense release mechanism located between the manual handle and lock mechanism or an adjustment of the decoupling force, and/or are relatively complex.

Several problems inherent in prior torque sensitive lock release mechanisms have been alleviated by a prior construction of applicant's assignee in which the actuating handle is connected to the lock mechanism by a slip clutch arrangement which includes a pair of co-axial cylindrical members. Opposed surfaces of the cylindrical members are releasably connected to each other by a single cylindrical dowel which fits into complimentary semi-cylindrical detents on the opposed surfaces. The dowel is maintained within the detent by the force of a compression spring which internally connects the two cylindrical members to each other. A first of the cylindrical members has a knurled outer cylindrical surface which is press fit within the hurled central opening of the actuating handle. Hence, as the actuating handle is rotated, the first cylindrical member will be rotated, with such rotational movement being transmitted to the second cylindrical member via the spring biased dowel detent connection. The second cylindrical member is in turn connected to the lock mechanism. Hence, should it be desired to maintain the lock mechanism in its "locked" condition, the application of excessive force will overcome the compression spring bias engagement of the two cylindrical members, thereby releasing the dowel from the detent. This results in disengagement of the lock mechanism from the operating handle. Further rotational movement of the operating handle will in turn re-engage the dowel and detent for subsequent proper operation. While this arrangement has provided enhanced performance over previously available products, it has been determined that over an excessive period of time, and in particular repeated attempts to vandalize the lock resulting in movement of the dowel out of its detent, there is a tendency of the shoulder of the semi-cylindrical detents to wear away, thereby affecting the torque sensitive release force. Further, should it be desired to then replace the torque sensitive release mechanism, while retaining the non-damaged actuating handle and lock mechanism, the knurled press fit connection of the torque sensitive release mechanism to the actuating handle renders such disengagement difficult, and sometimes impossible. Also, this press fit knurled connection might be weakened as a result of repeated attempts to overcome the mechanism in the "locked" condition. This naturally affects subsequent operation. Further, it has been determined that different applications of the device require a variation in the calibration of the force at which the torque sensitive mechanism is released. While this can be accomplished by utilizing a different spring, or otherwise modifying the components of the individual units, it would be desirable to permit an adjustment of this force with the existing compression spring and other components.

SUMMARY OF THE INVENTION

To further enhance the durability, ease of replacement, and adjustability of the torque sensitive release mechanism, several improvements have been provided. One of these is the avoidance of a press fit knurled connection between the slip clutch mechanism and the actuating handle, which either tended to be permanent, or weakened should excessive tampering be experienced over the course of time. A more positive threaded engagement is now provided. This not only is less prone to wear, but readily permits replacement should either the torque release mechanism become damaged, or it is desired to replace the torque release mechanism, though operating properly, with one that has a different force calibration.

To further improve the durability of the torque release mechanism, instead of utilizing a cylindrical dowel in semi-cylindrical detents, we now provide a plurality of arcuately spaced ball bearings located within arcuately spaced semi-hemispherical detents on the opposed connecting faces of the two cylindrical members forming the torque sensitive release mechanism.

In addition, variation of the calibration force maybe obtained by readily altering the connection to the lock mechanism. We provide this connection by a pin which passes through a pair of openings, defining a pin path, at the output of the torque sensitive release mechanism. Preferably, at least two such pin paths are provided, with the predetermined selection of one of the pin paths for connection to the lock mechanism serving to determine the excessive force necessary to disengage the cooperating cylindrical members of the torque sensitive release mechanism.

To further add to the universatality of my device, the connection to the lock mechanism is provided by a connecting bore, which may typically be of a square cross section. The first connecting pin path extends through one pair of the opposed walls, and a second connecting pin path extends through a second pair of the opposed walls. When connecting such a unit to lock mechanism which includes a square spindle, the lock mechanism spindle will be provided with a transverse opening adapted to be in alignment with the desired pin path, with a connecting pin being inserted through the aligned openings. Should the lock mechanism be of the type which does not include a spindle input, but has a square cross sectional opening adapted to receive a spindle, a separate spindle member or other connection means will be provided for connecting the output bore of the torque sensitive release mechanism to the input opening of the lock mechanism.

Accordingly, it is an object of the present invention to provide an improved vandal resistant torque release mechanism for coupling an actuating handle to a lock mechanism which demonstrates increased durability and flexibility over previously available devices.

Another object of the present invention is to provide such a vandal-resistant torque sensitive release mechanism in which the slip clutch portion is an integral assembly which may be readily inserted between the actuating handle and lock mechanism.

A further object of the present invention is to provide such a torque sensitive release mechanism which is connected to the actuating handle by threaded engagement.

Yet a further object of the present invention is to provide such a torque sensitive release mechanism for a lock mechanism in which a plurality of spherical balls, seated in complimentary hemispherical detents, connect the spring biased members together.

Yet still another object of the present invention is to provide such a torque sensitive release mechanism for coupling an actuating handle to lock mechanism which readily permits a variation in the decoupling force.

These as well as other objects and advantages of the present invention are depicted in the following drawings and described with reference to a preferred embodiment.

BRIEF DESCRIPTION OF THE DRAWINGS

FIG. 2 is a partially cut away perspective view of the vandal-resistant torque sensitive release mechanism in conjunction with the actuating handle.

FIG. 3 is an exploded view of the components forming the torque sensitive release mechanism, and including the connecting spindle to the lock mechanism.

FIG. 4 is a cross sectional view of the assembled torque sensitive release mechanism, shown in the operating torque transmitting condition.

FIG. 5 is a partially cut away perspective view corresponding to the condition of FIG. 4.

FIG. 6 is a perspective view of the vandal-resistant torque sensitive release mechanism shown after being subjected to excessive force, with the torque transmitting components being decoupled.

Figure 1:
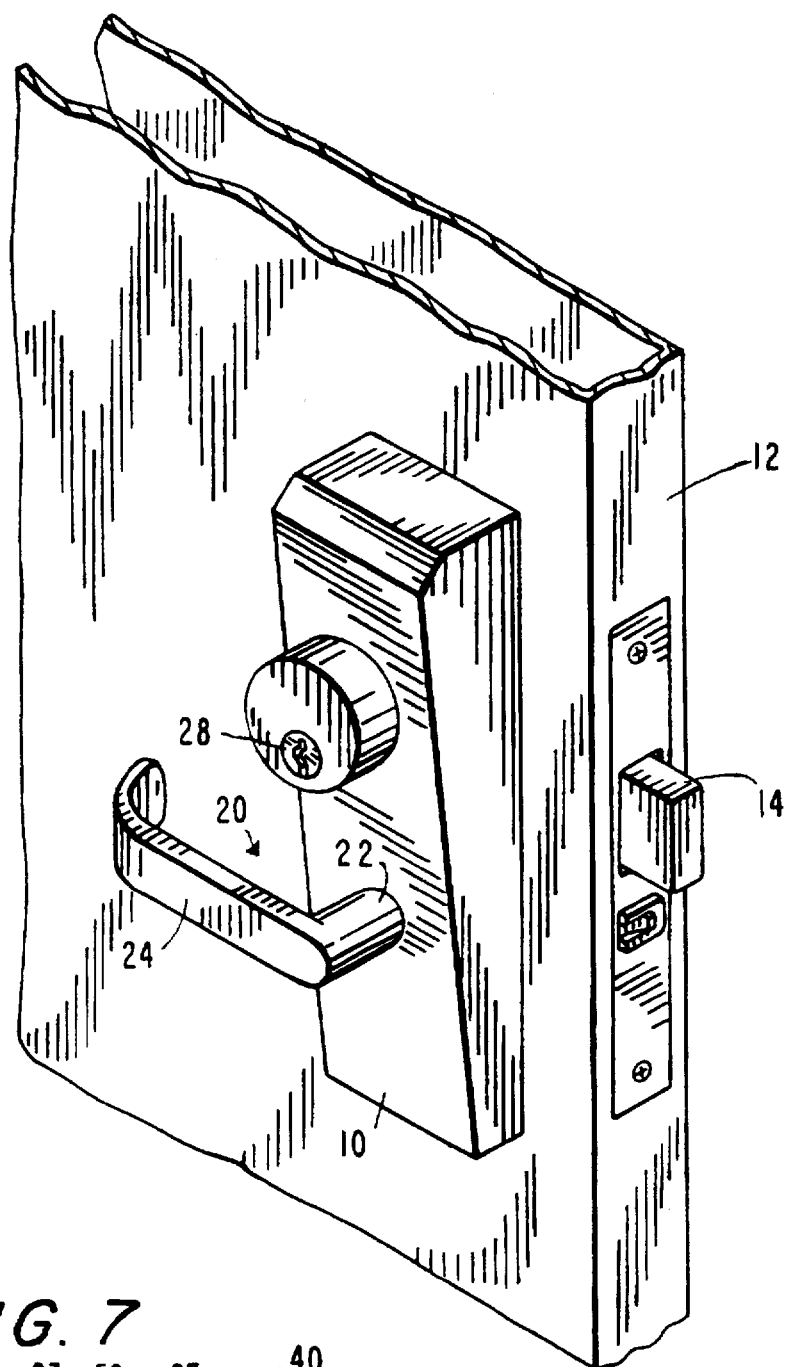
FIG. 1 is a perspective view generally showing an environment for the installation of the vandal-resistant torque sensitive release mechanism of the present invention.

Referring initially to FIG. 1, the operating lock mechanism lever handle unit 10 is installed in door 12, and is connected to a lock mechanism which preferably includes a deadbolt 14 for engagement with a cooperating recess within the door jamb (not shown). The lever handle unit 10 is operated by actuating handle 20 which includes a cup like portion 22 and a manual operating handle 24. In the well known manner, a key is inserted into recess 28 and rotated to permit the appropriate rotation of manual handle 24 to operate the lock mechanism 10, via the vandal-resistant torque sensitive release mechanism discussed below in conjunction with FIG. 2–7. More specifically, should the proper key not be inserted within recess 28 and rotated, actuating handle 20 should not be able to operate the lock mechanism 10. In the event excessive force is applied to the actuating handle 20, as by a tampering attempt, the present invention provides for a decoupling between actuating handle 20 and lock mechanism 10, so as to both prevent undesired opening of the lock mechanism 10, without damage to any of the operating components.

Reference is now made to FIGS. 2–5 which show the torque sensitive release mechanism in the operative, or coupled position. The cup like portion 22 of actuating handle includes an internal screw thread 30 for threaded engagement with the slip-clutch type torque sensitive release mechanism. The torque sensitive release mechanism includes a first cylindrical member 35 having opposed first end 31 and second end 32. An external screw thread 33 extends from adjacent end 32 towards end 31. External screw thread 33 is of a pitch and length to engage to the internal thread 30 of the actuating handle. The first cylindrical member 35 includes an interior chamber extending between its opposed ends 31–32, with a first compartment 36 communicating with end 31, and a second compartment 37, communicating with end 32. An interior shoulder 16 divides the interior chamber into the compartments 36–37. An annular wall 38 at the end 31 includes a plurality of arcuately spaced generally semi-hemispherical detent depressions 39. In the particular embodiment shown herein, four such depressions 39 are shown, orthogonally spaced, an equal distance from the axis of cylindrical member 35. It should however, be understood that a different number of such depressions may be provided which should however, be equally arcuately spaced about annular wall 38.

A second cylindrical member 40 is an axial alignment with the first cylindrical member and includes a first end 41 and second end 42. End 42 includes a plurality of arcuately spaced generally semi-hemispherical depressions 43 which correspond, and are complimentary to, depressions 39 in the annular wall 38 of the first cylindrical member 35. An individual spherical ball bearing type element 45 is placed in each of the opposed generally semi-hemispherical depression 39–43 in opposed annular walls 38–42. The second cylindrical member further includes a reduced diameter boss 46 which is located within, and of a length generally corresponding to the first internal compartment 36 of the first cylindrical member 35. The outer diameter of boss 46 generally corresponds to, but is slightly less than the internal diameter of compartments 36, so as to provide a snug fit therein. Boss 46 includes an internal thread 48.

A compression spring 50 is located within the second compartment 37 of the first cylindrical member 35. Compression 50 is of a length substantially corresponding to the length of internal compartment 37, and has an outer diameter substantially corresponding, but slightly less than, the interior diameter of compartment 37, so that spring 50 may be snugly contained therein. A connecting bolt 60 having a head portion 62 and an external threaded shank 64 extends through the interior of the compression spring 50, and threadly engages the internal thread 48 of the boss 46. Hence the threaded engagement of the connecting bolt 60 and boss 46 compress the coil spring 50 with a predetermined force to urge the annular walls 38, 42 together through the cooperative connection of the plurality of arcuately spaced spherical ball connectors 45. It should further be understood that the application of a predetermined excessive force will defeat this engagement, thereby disconnecting the cylindrical members 35–40.

Figure 7:
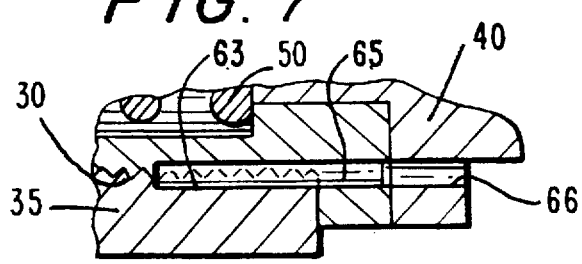
FIG. 7 is a sectional view as shown by the arrows 7—7 of FIG. 2.

Another advantageous feature of the present invention is the inclusion of a pair of aligned apertures 63 and 66, provided on opposed shoulders of the slip clutch members 35 and 40. After members 35 and 40 are assembled and threadably inserted within the threaded bore 30 of the operating handle cup-like portion 22, a pin 65 is then inserted through aligned openings 63, 66. The pin 65 is then appropriately depressed completely through the opening 66. Pin 65 is of a predetermined length such that, as a result of such inward depression, its forward end will fracture several of the uppermost screw threads 30, as shown in FIG. 7. This serves to provide an increased secure engagement between the slip clutch assembly 35–40 and operating handle 20. However, should it be desired to remove the slip clutch assembly for replacement, pin 65 may then be drilled out. Thereafter, upon the application of appropriate rotational force, the slip clutch assembly is threaded outward from the operating handle.

The end 41 of the second cylindrical member 40 is adapted to be connected to the lock mechanism (the details of which are not shown). As is well known, such a lock mechanism may either include an externally extending spindle, usually of square cross section, an opening adapted to receive such a spindle, or have a threaded or other suitable intermediate connector. In order to enhance the universatality of my torque sensitive release mechanism it is designed to accommodate any such connection to the lock mechanism. One such typical connection is shown in the present embodiment. More specifically, extending inward from end 41 is an internal connecting bore 70, which is of a square cross section. Bore 70 extends toward the terminus of the internally threaded opening 48. The internal connecting bore 70 is configured to receive the connecting spindle 80 of a particular type of lock mechanism. The connection therebetween is made via a pin 72 which extends between openings 74–76 on opposed walls of the internal connecting bore, and opening 78 extending transversely through connecting spindle 80. Advantageously, two such paths for the reception of pin 72 are provided at opposed walls of the internal connecting bore 70, with the other set of openings being shown as 74', 76'. Hence, by selecting which of the pin paths (74–76, or 74'–76') is to be utilized for connections to spindle 80, we calibrate the operative force for defeating the biasing provided by compression spring 50.

Spindle 80 may be a separate member with its opposite end 82 appropriately shaped to connect with the lock mechanism. Alternatively, where the lock mechanism includes such a spindle, spindle 80 would be integral with the lock mechanism.

Reference is now made to FIG. 6 which shows the disengagement of the torque sensitive release mechanism, with spherical members 45 slipping out of their cooperating detents 39–43 upon the application of a predetermined excessive force. In this situation, the cylindrical members 35–40 are decoupled and hence the manual turning of actuating handle 20 will be decoupled from the lock mechanism, thereby preventing tampering, as well as destruction of the lock mechanism. Further turning of the handle 20 will reset the spherical members 45 within their detents 39, 43, so as to permit proper subsequent operation upon the insertion of the appropriate key in recess 28 (as shown in FIG. 1).

Accordingly, we have provided an improved vandal-resistant torque sensitive release mechanism for coupling an actuating handle to a lock mechanism, which provides increased durability, ease of replacement, and adjustability.

It should be appreciated that other modifications and variations are anticipated within the spirit and scope of the following claims, which define the scope of our invention.

What is claimed:

1. A vandal-resistant toque sensitive release mechanism for coupling an actuating handle to a lock mechanism, comprising;
   - a first cylindrical member having first and second ends, an interior chamber extending between said first and second ends, a first annular wall at said first end, an interior shoulder within said interior chamber dividing said interior chamber into first and second compartments, said first compartment extending from said first end to said interior shoulder, and said second compartment extending from said second end to said interior shoulder, said first compartment being of lessor diameter than said second compartment;
   - a second cylindrical member in axial alignment with said first cylindrical member and having first and second ends, a second annular wall recessed from said second end, of said second cylindrical member said first end of said second cylindrical member including connecting means for connecting said second cylindrical member to a lock mechanism;
   - a cylindrical boss on said second cylindrical member including an integrally threaded central opening extending between said second annular wall and said second end, said boss being of lesser diameter than said second annular wall, and having an outer diameter corresponding to but less than the inner diameter of said first compartment, and a length corresponding to the length of said first compartment, such that said boss of said second cylindrical member is snugly contained within said first compartment of said first cylindrical member; and
   - a compression spring mounted in said second compartment, having first and second ends and an outer diameter corresponding to but less than the inner diameter of said second compartment, such that said compression spring is contained in said second compartment, said first end engaging said interior shoulder;
   - each of said first and second annular walls including an equal plurality of arcuately spaced semi-hemispherical depressions which are in an opposed relationship,
   - a spherical ball connector in each of the opposed depressions in said annular walls; a connecting bolt having a head portion and an externally threaded shank, said head contacting said second end of said coil spring, and said externally threaded shank extending through said coil spring and threadedly engaging said internally threaded central opening of said boss;
   - the threaded engagement of said connecting bolt and boss compressing said coil spring with a predetermined force to urge the first and second annular walls together through the cooperative connection of said plurality of spherical ball connectors, with the application of a predetermined excessive force defeating said cooperative connection to disconnect said first cylindrical member from said second cylindrical member and lock mechanism, and
   - said first cylindrical member further including an externally threaded outer surface adapted to be connected to an internally threaded portion of an actuating handle.

2. The vandal resistant torque sensitive release mechanism of claim 1, wherein:
   - said connecting means at the first end of said second cylindrical member comprises an internal connecting bore, a plurality of connecting pin paths extending about said bore and transverse to said connecting bore, a connecting pin inserted in one of said connecting pin paths to selectively connect said second cylindrical member to the lock mechanism to provide an adjustment of the magnitude of said predetermined excessive force necessary to defeat the connection between an actuating handle connected to said first cylindrical member and a lock mechanism connected to said second cylindrical member.

3. The vandal resistant torque sensitive release mechanism of claim 2, wherein:

said connecting bore is of a square cross section, having first and second pairs of opposed walls, a first connecting pin path extending through said first pair of opposed walls, and a second connecting pin extending through said second pair of opposed walls.

4. The vandal resistant torque sensitive release mechanism of claim 3, further including a square cross section spindle having first and second ends, and a transverse opening at said first end;

said transverse opening of said connecting spindle being in alignment with the connecting pin path openings extending through a selected one of said pair of opposed internal walls, with said connecting pin extending through said wall openings and transverse spindle opening for selectively connecting said connecting spindle to said second cylindrical member; and said second end of said connecting spindle is adapted for connection to a lock mechanism.

5. The vandal resistant torque sensitive release mechanism of claim 1, wherein:

each of said first and second annular walls include four orthogonally spaced semi-spherical depressions.

6. The vandal resistant torque sensitive release mechanism of claim 1, wherein:

said head portion of said connecting bolt having an outer diameter corresponding to but less than the inner diameter of said second compartment, but exceeding the outer diameter of said coil spring.

7. In combination with the vandal-resistant torque sensitive release mechanism of claim 1:

an actuating handle including a cup-like portion in axial alignment with said first and second cylindrical members and a manual handle portion radially extending outward of said cup-like portion, said cup-like portion including an internal thread corresponding in pitch and length to the externally threaded outer surface of said first cylindrical member.

8. The combination of claim 7 wherein:

said connecting means at the first end of said second cylindrical member comprises an internal connecting bore, a plurality of connecting pin paths extending about said bore and transverse to said connecting bore a connecting pin inserted in one of said connecting pin paths to selectively connect said second cylindrical member to the lock mechanism to adjust the magnitude of said predetermined excessive force necessary to defeat the connection between an said actuating handle connected to said first cylindrical member and a lock mechanism connected to said second cylindrical member.

9. The combination of claim 8, wherein:

said connecting bore is of a square cross section, having first and second pairs of opposed walls, a first connecting pin path extending through said first pair of opposed walls, and a second connecting pin path extending through said second pair of opposed walls;

a square cross section spindle having first and second ends, and a transverse opening at said first end;

said transverse opening of said connecting spindle being in alignment with the connecting pin path openings extending through a selected one of said pair of opposed walls, with said connecting pin extending through said wall openings and transverse spindle opening for selectively connecting said connecting spindle to said second cylindrical member; and said second end of said connecting spindle adapted for connection to a lock mechanism.

10. The combination of claim 7, wherein:

said head portion of said connecting bolt having an outer diameter less than the inner diameter of said second compartment, but exceeding the outer diameter of said coil spring.

11. The combination of claim 8, wherein:

said head portion of said connecting bolt having an outer diameter corresponding to but less than the inner diameter of said second compartment, but exceeding the outer diameter of said coil spring.

12. The combination of claim 1 further including means for fracturing a predetermined portion of the threaded engagement between the externally threaded outer surface of said first cylindrical member and the internally threaded portion of the actuating handle.

13. A vandal-resistant torque sensitive release mechanism for coupling an actuating handle to a lock mechanism, comprising:

a first cylindrical member having first and second ends, an interior chamber extending between said first and second ends, a first annular wall at said first end, an interior shoulder within said interior chamber dividing said interior chamber into first and second compartments, said first compartment extending from said first end to said interior shoulder, and said second compartment extending from said second end to said interior shoulder, said first compartment being of lessor diameter than said second compartment;

a second cylindrical member in axial alignment with said first cylindrical member and having first and second ends, a second annular wall recessed from said second end, of said cylindrical member said first end of said second cylindrical member including connecting means for connecting said second cylindrical member to a lock mechanism;

a cylindrical boss on said second cylindrical member including an integrally threaded central opening extending between said second annular wall and said second end, said boss being of lesser diameter than said second annular wall, and having an outer diameter corresponding to but less than the inner diameter of said first compartment, and a length corresponding to the length of said first compartment, such that said boss of said second cylindrical member is contained within said first compartment of said first cylindrical member; and a compression spring mounted in said second compartment, having first and second ends and an outer diameter corresponding to but less than the inner diameter of said second compartment, such that said compression spring is contained in said second compartment, said first end engaging said interior shoulder;

each of said first and second annular walls including an equal plurality of arcuately spaced semi-hemispherical depressions which are in an opposed relationship, a spherical ball connector in each of the opposed depressions in said annular walls; a connecting bolt having a head portion and an externally threaded shank, said head contacting said second end of said coil spring, and said externally threaded shank extending through said coil spring and threadedly engaging said internally threaded central opening of said boss;

the threaded engagement of said connecting bolt and boss compressing said coil spring with a predetermined force to urge the first and second annular walls together through the cooperative connection of said plurality of spherical ball connectors, with the application of a predetermined excessive force defeating said cooperative connection to disconnect said first cylindrical member from said second cylindrical member and lock mechanism, and said connecting means at the first end of said second cylindrical member comprises an internal connecting bore, a plurality of connecting pin paths extending about said bore and transverse to said connecting bore, a connecting pin inserted in one of said connecting pin paths to selectively connect said second cylindrical member to the lock mechanism to provide an adjustment of the magnitude of said predetermined excessive force necessary to defeat the connection between an actuating handle connected to said first cylindrical member and a lock mechanism connected to said second cylindrical member.

14. The vandal resistant torque sensitive release mechanism of claim 13, wherein:

said connecting bore is of a square cross section, having first and second pairs of opposed walls, a first connecting pin path extending through said first pair of opposed walls, and a second connecting pin extending through said second pair of opposed walls.

15. The vandal resistant torque sensitive release mechanism of claim 14, further including a square cross section spindle having first and second ends, and a transverse opening at said first end;

said transverse opening of said connecting spindle being in alignment with the connecting pin path openings extending through a selected one of said pair of opposed walls, with said connecting pin extending through said wall openings and transverse spindle opening for selectively connecting said connecting spindle to said second cylindrical member; and said second end of said connecting spindle is adapted for connection to a lock mechanism.

16. The vandal resistant torque sensitive release mechanism of claim 13, wherein:

each of said first and second annular walls include four orthogonally spaced semi-spherical depressions.

17. A vandal-resistant torque sensitive lock release mechanism comprising:

an actuating handle;

a first cylindrical member having first and second ends, an interior chamber extending between said first and second ends, a first annular wall at said first end, an interior shoulder within said interior chamber dividing said interior chamber into first and second compartments, said first compartment extending from said first end to said interior shoulder, and said second compartment extending from said second end to said interior shoulder, said first compartment being of lessor diameter than said second compartment;

a handle connecting means carried by said actuating handle and first cylindrical member for connecting said actuating handle to said first cylindrical member;

a second cylindrical member in axial alignment with said first cylindrical member and having first and second ends, a second annular wall recessed from said second end, of said second cylindrical member said first end of said second cylindrical member including connecting means for connecting said second cylindrical member to a lock mechanism;

a cylindrical boss on said second cylindrical member including an integrally threaded central opening extending between said second annular wall and said second end, said boss being of lesser diameter than said second annular wall, and having an outer diameter corresponding to but less than the inner diameter of said first compartment, and a length corresponding to the length of said first compartment, such that said boss of said second cylindrical member is contained within said first compartment of said first cylindrical member; and a compression spring mounted in said second compartment, having first and second ends and an outer diameter corresponding to but less than the inner diameter of said second compartment such that said compression spring is contained in said second compartment, said first end engaging said interior shoulder;

each of said first and second annular walls including a plurality of equally arcuately spaced semi-hemispherical depressions which are in an opposed relationship;

a spherical ball connector in each of the opposed depressions in said annular walls;

a connecting bolt having a head portion and an externally threaded shank, said head contacting said second end of said coil spring, and said externally threaded shank extending through said coil spring and threadedly engaging said internally threaded central opening of said boss;

the threaded engagement of said connecting bolt and boss compressing said coil spring with a predetermined force to urge the first and second annular walls together through the cooperative connection of said plurality of spherical ball connectors, with the application of a predetermined excessive force defeating said cooperative connection to disconnect said first cylindrical member from said-second cylindrical member and lock mechanism; and a lock connecting means for connecting said first end of said second cylindrical member to a lock mechanism.

18. The vandal-resistant torque sensitive lock release mechanism of claim 17 wherein:

said handle connecting means including a pair of threaded elements, a first of said threaded elements being an externally threaded outer surface along a portion of said first cylindrical member extending from its second end;

said actuating handle including a cup-like portion in axial alignment with said first and second cylindrical members, and a manual handle portion radially extending outward of said cup-like portion;

said cup-like portion including the second of said threaded elements as an internal thread corresponding in pitch and length to said first threaded element.

19. The vandal-resistant torque sensitive lock release mechanism of claim 18, further including means for fracturing a predetermined portion of the threaded engagement between said cup-like portion and said first threaded element.

20. The vandal-resistant torque sensitive lock release mechanism of claim 17, wherein:

said lock connecting means comprises an internal connecting bore at the first end of said second cylindrical member which includes a plurality of connecting pin paths extending about said bore and transverse to said connecting bore, a connecting pin inserted in one of said connecting pin paths to selectively connect said second cylindrical member to the lock mechanism to adjust the magnitude of the predetermined excessive force necessary to defeat the connection between said actuating handle connected to said first cylindrical member, and a lock mechanism connected to said second cylindrical member.

21. The vandal-resistant torque sensitive lock release mechanism of claim 20, wherein:

said connecting bore is of a square cross section, having first and second pairs of opposed walls, a first connecting pin path extending through said first pair of opposed walls, and a second connecting pin path extending through said second pair of opposed walls;

a square cross section spindle having first and second ends, and a transverse opening at said first end;

said transverse opening of said connecting spindle being in alignment with the connecting pin path openings extending through a selected one of said pair of opposed walls, with said connecting pin extending through said wall openings and transverse spindle opening for selectively connecting said connecting spindle to said second cylindrical member; and said second end of said connecting spindle adapted for connection to a lock mechanism.

* * * * *